No. 619,582. Patented Feb. 14, 1899.
J. R. KUNZELMAN.
RAILWAY SPIKE.
(Application filed July 13, 1898.)
(No Model.)
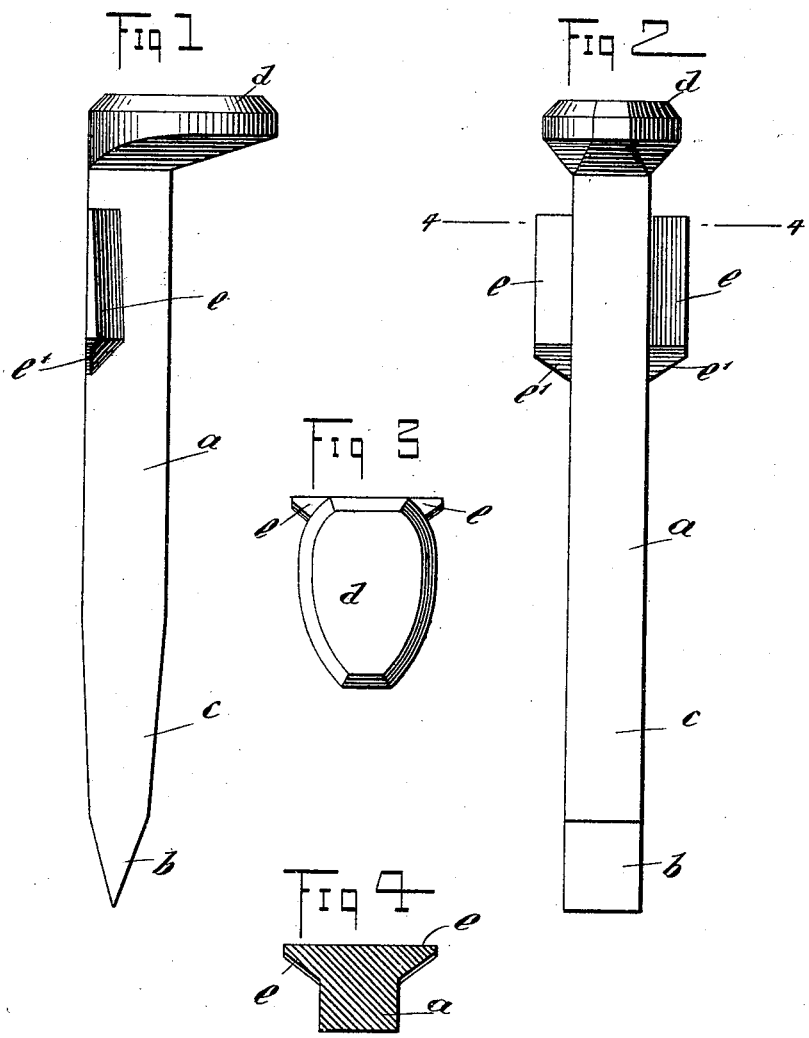
WITNESSES:
INVENTOR
J. R. Kunzelman
BY
ATTORNEYS.

UNITED STATES PATENT OFFICE.

JOHN R. KUNZELMAN, OF STILLWATER, MINNESOTA.

RAILWAY-SPIKE.

SPECIFICATION forming part of Letters Patent No. 619,582, dated February 14, 1899.

Application filed July 13, 1898. Serial No. 685,813. (No model.)

*To all whom it may concern:*

Be it known that I, JOHN R. KUNZELMAN, of Stillwater, in the county of Washington and State of Minnesota, have invented a new and Improved Railway-Spike, of which the following is a full, clear, and exact description.

This invention relates to a railway-spike, the purpose of which is to render the spike more secure in the tie and avoid the spreading of the rails under lateral pressure, which spreading is a very common disadvantage of the spikes previously used, and also to obtain thereby double or more support from the same spike than that which is now obtained from the spikes in common use.

This specification is the disclosure of one form of my invention, while the claim defines the actual scope of the invention.

Reference is to be had to the accompanying drawings, forming a part of this specification, in which similar characters of reference indicate corresponding parts in all the figures.

Figure 1 is a side elevation of the invention. Fig. 2 is a rear elevation of the invention. Fig. 3 is a plan view, and Fig. 4 is a section on the line 4 4 of Fig. 2.

The spike has a shank $a$ approximately square in cross-section and formed with a chisel-point $b$, formed by oppositely-beveled faces, serving readily to enter the tie. The front and rear faces of the shank $a$ are formed with a slight taper, (indicated by the letter $c$,) which taper reduces the size of the lower portion of the shank, thus causing the upper portion of the shank to be wedged into the wood with great firmness.

The spike has the usual head $d$, projecting rearwardly from the upper end of the shank. For the purpose of preventing the spike from being forced laterally out of position and for the purpose of strengthening said spike in its weakest point I provide the shank $a$ with two wings $e$, which project from opposite sides of the shank and which are located at the front face thereof. The upper edges of the wings are located below the head $d$ for a distance sufficient to permit the engagement of the usual claw with the head of the spike for withdrawing the same. Each wing $e$ is provided with a bevel lower edge $e'$, adapted to cut into the wood as the wings pass in with the spike. The lower portion of each wing $e$ is thicker than the upper portion, so that as the wings enter the wood the wood closes in upon the reduced upper portions of the wings, thus practically concealing the wings and rendering the engagement of the spike with the wood more secure.

A spike thus constructed when driven into the wood will be engaged therewith with great firmness, and the spreading action of the rails against the spike will not throw the spike out of place owing to the action of the wings $e$ engaging with the wood. The tapered portion $c$ of the shank of the spike also serves materially to strengthen the position of the spike in the wood.

Having thus described my invention, I claim as new and desire to secure by Letters Patent—

A railway-spike having a shank, and a laterally-projected wing attached to the shank, the wing having a sharpened lower edge and having its lower portion of greater thickness than the upper portion.

JOHN R. KUNZELMAN.

Witnesses:
A. W. COMFORT,
F. V. COMFORT.